(12) United States Patent
Nagayama et al.

(10) Patent No.: US 6,383,683 B1
(45) Date of Patent: May 7, 2002

(54) PROCESS FOR PRODUCING SPINEL TYPE LITHIUM MANGANATE

(75) Inventors: Masatoshi Nagayama; Shinji Arimoto, both of Osaka; Koichi Numata; Tsuneyoshi Kamada, both of Hiroshima, all of (JP)

(73) Assignee: Mitsui Mining and Smelting Company, Ltd., Tokyo (JP)

( * ) Notice: Subject to any disclaimer, the term of this patent is extended or adjusted under 35 U.S.C. 154(b) by 0 days.

(21) Appl. No.: 09/509,477

(22) PCT Filed: Jun. 8, 1999

(86) PCT No.: PCT/JP99/03062

§ 371 Date: Mar. 28, 2000

§ 102(e) Date: Mar. 28, 2000

(87) PCT Pub. No.: WO00/06496

PCT Pub. Date: Feb. 10, 2000

(30) Foreign Application Priority Data

Jul. 31, 1998 (JP) .......................................... 10-217369

(51) Int. Cl.[7] .............................................. H01M 4/50
(52) U.S. Cl. ..................... 429/224; 429/231.1; 423/599

(58) Field of Search ................................ 423/599, 605; 429/224, 231.1, 218.1

(56) References Cited

U.S. PATENT DOCUMENTS

| 5,425,932 A | * | 6/1995 | Tarascon | 423/599 |
| 5,783,328 A | * | 7/1998 | Wang | 429/137 |
| 6,103,422 A | * | 8/2000 | Kanai | 429/224 |
| 6,159,636 A | * | 12/2000 | Wang et al. | 429/223 |

FOREIGN PATENT DOCUMENTS

| JP | 05-021062 | 1/1993 |
| JP | 05-174823 | 7/1993 |
| JP | 09-063583 | 3/1997 |
| JP | 09-188519 | 7/1997 |
| JP | 10-294099 | 11/1998 |

* cited by examiner

*Primary Examiner*—Carol Chaney
(74) *Attorney, Agent, or Firm*—Young & Thompson

(57) ABSTRACT

Electrolytic manganese dioxide is pulverized. The manganese dioxide power is neutralized with sodium hydroxide or sodium carbonate to a pH of 2 or higher. The neutralized electrolytic manganese dioxide powder is mixed with a lithium raw material and the mixture is fired.

10 Claims, 1 Drawing Sheet

PROCESS FOR PRODUCING SPINEL TYPE LITHIUM MANGANATE

TECHNICAL FIELD

The present invention relates to a process of producing spinel-type lithium manganate. More particularly it relates to a process for producing spinel-type lithium manganate which, when used as a cathode material of a nonaqueous secondary battery, suppresses dissolution of manganese therefrom thereby securing improved high-temperature characteristics of the battery such as high-temperature storage properties and high-temperature cycle characteristics.

BACKGROUND ART

With the recent rapid development of portable and wireless electronic equipment such as personal computers and telephones, the demand for secondary batteries as a driving power source has been increasing. In particular nonaqueous secondary batteries are expected for their smallest size and high energy density. Cathode active materials for nonaqueous secondary batteries meeting the demand include lithium cobaltate ($LiCoO_2$), lithium nickelate ($LiNiO_2$), lithium manganate ($LiMn_2O_4$), etc. Having an electrode potential of 4 V or higher with respect to lithium, these complex oxides are capable of providing batteries having a high energy density.

Of the above-described complex oxides, $LiCoO_2$ and $LiNiO_2$ have a theoretical capacity of about 280 mAb/g, while $LiMn_2O_4$ has a theoretical capacity as low as 148 mAh/g, but is deemed suited for use in electric vehicles and the like because of an abundant and inexpensive supply of manganese oxide as a raw material and freedom from such thermal instability in charging as observed with $LiNiO_2$.

However, lithium manganate ($LiMn_2O_4$) is disadvantageous in that manganese dissolves out in high temperature to reduce the high-temperature battery performance, such as high-temperature storage properties and high-temperature cycle characteristics.

DISCLOSURE OF THE INVENTION

Accordingly, an object of the present invention is to provide a process for producing spinel-type lithium manganate which, when used as a cathode material of a nonaqueous secondary battery, suppresses dissolution of manganese therefrom thereby securing improved high-temperature characteristics of the battery such as high-temperature storage properties and high-temperature cycle characteristics and to provide a nonaqueous secondary battery using the cathode material.

Japanese Patent Laid-Open No. 139861/90 teaches that addition of a given amount of sodium to spinel-type lithium manganate brings about improvement on the room temperature cycle life. The publication describes a process comprising adding a sodium raw material to a manganese raw material and a lithium raw material and firing the mixture. Being inexpensive and abundant, electrolytic manganese dioxide is suitable as a manganese raw material for spinel-type lithium manganate. After electrolysis, electrolytic manganese dioxide is usually neutralized with ammonia for use in manganese dry batteries and with soda for use in alkali manganese batteries. It is known that soda-neutralized electrolytic manganese dioxide contains a small amount of residual sodium. The amount of the residual sodium depends on the neutralization conditions.

Having noted the neutralization conditions of electrolytic manganese dioxide, the present inventors have found that spinel-type lithium manganate obtained under specific neutralization conditions accomplishes the above object.

The present invention has been completed based on the above finding and provides a process of producing spinel-type lithium manganate which is characterized by comprising pulverizing electrodeposited manganese dioxide, neutralizing the powder with sodium hydroxide or sodium carbonate to a pH of 2 or higher, mixing the resulting electrolytic manganese dioxide with a lithium raw material, and firing the mixture.

BEST MODE FOR CARRYING OUT THE INVENTION

Figure 1:
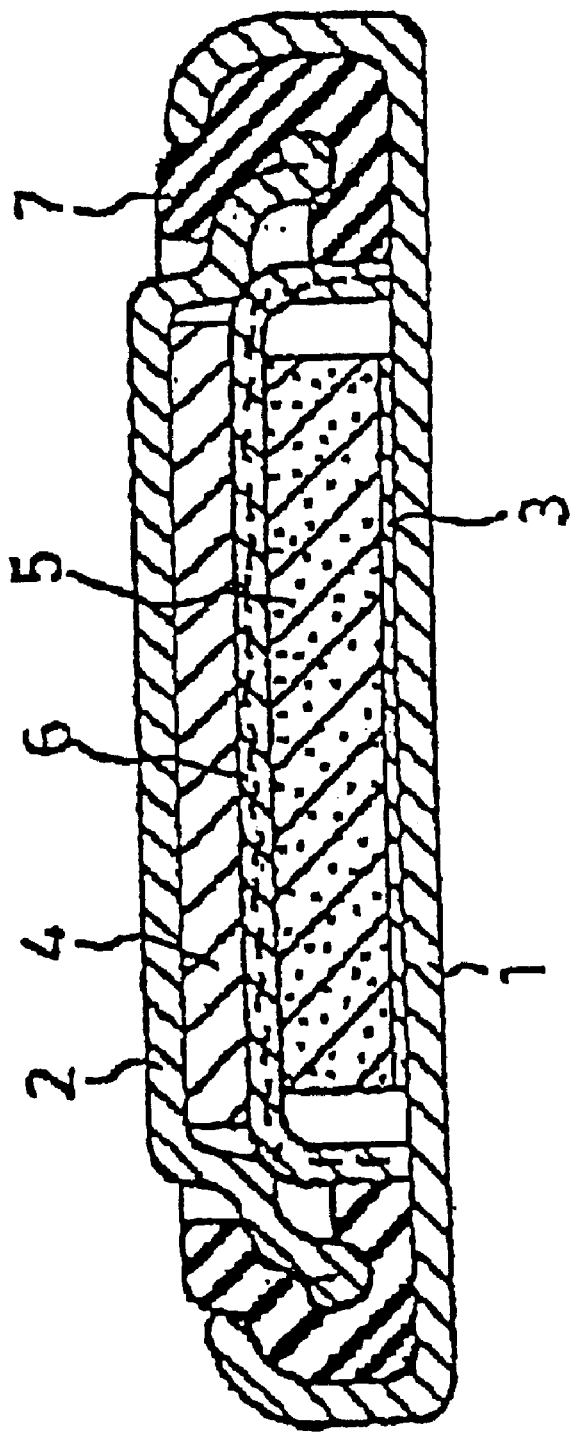
FIG. 1 is a cross sectional view of a coin type nonaqueous secondary battery prepared in Examples and Comparative Examples.

The present invention will now be described in detail.

In the present invention, electrolytic manganese dioxide is used as a raw manganese material of spinel-type lithium manganate.

The electrolytic manganese dioxide used in the invention is obtained by the following method. For example, electrolysis of a manganese sulfate solution having a prescribed concentration is conducted while heating at a constant current density by using a carbon plate as a cathode and a titanium plate as an anode to electrodeposited manganese dioxide on the anode. The electrodeposited manganese dioxide is peeled off the anode and pulverized to a prescribed particle size, preferably an average particle diameter of 5 to 30 $\mu$m.

Since the cathode of a nonaqueous secondary battery has a film form of about 100 $\mu$m in thickness, too large particles cause cracks and the like and are difficult to make into a film of uniform thickness. Spinel-type lithium manganate synthesized from electrolytic manganese dioxide having an average particle size of 5 to 30 $\mu$m provides a cathode material fit for film formation without requiring an additional pulverization operation. It is assumed that the thus obtained finely particulate electrolytic manganese dioxide, upon being neutralized with sodium, allows sodium to be uniformly distributed there through.

After soda neutralization, the electrolytic manganese dioxide ground to a prescribed particle size is washed with water and dried. Specifically, soda neutralization is effected with sodium hydroxide or sodium carbonate. The order of pulverization and neutralization is not particularly restricted. That is, pulverization may be preceded by neutralization.

The pH of the neutralized electrolytic manganese dioxide is 2 or higher, preferably from 2 to 5.5, still preferably from 2 to 4. The higher the pH, the less the amount of manganese dissolved in high temperature, but the less the initial discharge capacity. At a pH lower than 2, the effect is insufficient.

In the present invention, the resulting electrolytic manganese dioxide is mixed with a lithium raw material and fired to give spinel-type lithium manganate. Lithium salts include lithium carbonate ($Li_2CO_3$), lithium nitrate ($LiNO_3$), and lithium hydroxide (LiOH). The molar ratio of Li in the lithium raw material to Mn in the electrolytic manganese dioxide, Li/Mn, is preferably 0.50 to 0.60.

For obtaining a larger reactive cross-sectional area, it is preferred that the electrolytic manganese dioxide and the lithium raw material be ground before or after being mixed.

The weighed and mixed materials can be used either as such or after being granulated. Granulation can be carried out in either a wet system or a dry system. Methods of granulation include piston granulation, tumbling granulation, fluidized bed granulation, mixing granulation spray drying, pressure forming granulation, and flaking granulation using a roll, etc.

The resulting raw material is put in firing furnace and fired at 600 to 1000° C. to obtain spinel-type lithium manganate. While a firing temperature of about 600° C. would be enough for obtaining spinel-type lithium manganate of single phase, grain growth does not proceed at a low firing temperature. Therefore, a firing temperature of 750° C. or higher, preferably 850° C. or higher is required. The firing furnaces which can be used include a rotary kiln and a stationary furnace. The firing time is 1 hour or longer, preferably 5 to 20 hours.

In this manner, spinel-type lithium manganate containing a given amount of sodium can be obtained. A preferred sodium content is 0.05 to 1.0% by weight. The sodium-containing spinel-type lithium manganate is useful as a cathode material of a nonaqueous secondary battery.

In the nonaqueous secondary battery of the present invention, the above-described cathode material is mixed with a conductive material, such as carbon black and a binder, such as Teflon binder, to prepare a cathode material mixture. For an anode, lithium or a material capable of intercalating and disintercalating lithium, such as carbon, is used. Nonaqueous electrolytes which can be used are not particularly limited and include a lithium salt, e.g., lithium hexafluorophosphate ($LiPF_6$), dissolved in a mixed solvent, such as ethylene carbonate/dimethyl carbonate.

Since manganese can be suppressed from dissolving in a charged state, the nonaqueous secondary battery according to the present invention exhibits improved high-temperature battery characteristics such as high-temperature storage properties and high-temperature cycle characteristics.

The present invention will now be illustrated in greater detail with reference to Examples, but it should be understood that the invention is not limited thereto.

EXAMPLE 1

An aqueous manganese sulfate solution having a sulfuric acid concentration of 50 g/l and a manganese concentration of 40 g/l was prepared as an electrolytic solution. The electrolytic solution was heated to 95° C., and electrolysis was performed at a current density of 60 $A/m^2$ using a carbon plate as a cathode and a titanium plate as an anode. Manganese dioxide thus electrodeposited was peeled and crushed into chips under the size of 7 mm, which were pulverized to an average particle size of about 20 µm.

Ten kilograms of the manganese dioxide was washed with 20 l of water. After discharging the washing, 20 l of water was added to the manganese dioxide, and 35 g of sodium hydroxide was dissolved therein, followed by stirring for 24 hours to carry out neutralization. The particles were washed with water, filtered, and dried (50° C. ×30 mins.)

The pH as measured in accordance with JIS K1467-1984 and the sodium content of the is resulting powder are shown in Table 1.

One kilogram of the thus obtained manganese dioxide having an average particle size of about 20 µm was mixed with lithium carbonate at an Li/Mn molar ratio of 0.54, and the mixture was fired in a box type kiln at 800° C. for 20 hours.

Eighty parts by weight of the resulting spinel-type lithium manganate, 15 parts by weight of carbon black, and 5 parts by weight of polytetrafluoroethylene (binder) were mixed to prepare a cathode material mixture.

A coin type nonaqueous secondary battery shown in FIG. 1 was assembled by using the resulting cathode material mixture. A cathode case 1 made of organic electrolytic solution-resistant stainless steel has a current collector 3 of the same stainless steel spot welded on the inner side thereof A cathode made of the cathode material mixture is press bonded on the upper side of the current collector 3. A porous polypropylene resin separator 6 impregnated with an electrolytic solution is placed on the upper side of the cathode 5. A sealing member 2 having an anode 4 made of metallic lithium bonded to the lower side thereof is fit into the opening of the cathode case 1 via a polypropylene gasket 7 thereby to seal the battery. The sealing member 2 combines the function as an anode terminal and is made of stainless steel similarly to the cathode case 1. The battery had a diameter of 20 mm and a height of 1.6 mm. The electrolytic solution used consisted of an equal volume mixture of ethylene carbonate and 1,3-dimethoxyethane having dissolved therein 1 mol/l of lithium hexafluorophosphate as a solute.

The resulting battery was subjected to a charge and discharge test. The charge and discharge test was carried out at 20° C. and at a current density of 0.5 $mA/cm^2$ within a voltage range of from 3 V to 4.3 V. The battery was charged to 4.3 V and, after storing at 80° C. for 3 days, the discharge capacity of the battery was confirmed. Further, the storage characteristics of the battery were confirmed in terms of discharge capacity retention after the storage, with the discharge capacity before the storage being taken as 100. The initial discharge capacity and the capacity retention against high-temperature storage thus obtained are shown in Table 1.

EXAMPLE 2

Spinel-type lithium manganate was synthesized in the same manner as in Example 1, except that the amount of sodium hydroxide added to neutralize the electrolytic manganese dioxide was changed to 53 g. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

EXAMPLE 3

Spinel-type lithium manganate was synthesized in the same manner as in Example 1, except that the amount of sodium hydroxide added to neutralize the electrolytic manganese dioxide was changed to 80 g. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

EXAMPLE 4

Spinet-type lithium manganate was synthesized in the same manner as in Example 1, except that the amount of sodium hydroxide added to neutralize the electrolytic manganese dioxide was changed to 120 g. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

EXAMPLE 5

Spinel-type lithium manganate was synthesized in the same manner as in Example 1, except that the amount of sodium hydroxide added to neutralize the electrolytic manganese dioxide was changed to 160 g. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

EXAMPLE 6

Spinel-type lithium manganate was synthesized in the same manner as in Example 1, except that the firing temperature was changed to 900° C. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

EXAMPLE 7

Spinel-type lithium manganate was synthesized in the same manner as in Example 1, except that the firing temperature was changed to 700° C. The pH and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

COMPARATIVE EXAMPLE 1

Spinel-type lithium manganate was synthesized in the same manner as in Example 1, except that the neutralization of the electrolytic manganese dioxide was not conducted (i.e., the amount of sodium hydroxide added was 0 g). The pH 4 and Na content after the neutralization are shown in Table 1. A coin type nonaqueous secondary battery was assembled using the resulting spinel-type lithium manganate as a cathode material, and the initial discharge capacity and the capacity retention against high-temperature storage were measured in the same manner as in Example 1. The results obtained are shown in Table 1.

TABLE 1

|  |  | pH (JIS) | Na (wt %) | Initial Discharge Capacity (mAh/g) | High-temp. Storage Capacity Retention (%) |
| --- | --- | --- | --- | --- | --- |
| Example | 1 | 2.5 | 0.13 | 122 | 75 |
|  | 2 | 3.5 | 0.20 | 118 | 79 |
|  | 3 | 4.5 | 0.45 | 114 | 82 |
|  | 4 | 5.0 | 0.54 | 113 | 85 |
|  | 5 | 6.0 | 0.65 | 107 | 86 |
|  | 6 | 3.5 | 0.20 | 116 | 88 |
|  | 7 | 3.5 | 0.20 | 119 | 70 |
| Compara. Example | 1 | 1.6 | 0.04 | 123 | 64 |

EXAMPLE 8

Spinel-type lithium manganate was synthesized in the same manner as in Example 1, except that the electrolytic manganese dioxide was pulverized to an average particle size of 5 μm. In the same manner as in Example 1, a coin type nonaqueous secondary battery was assembled using the resulting spinel-type lithium manganate as a cathode material. The charge and discharge test was carried out at current densities of 0.5 mA/cm$^2$ ad 1.0 mA/cm$^2$ The ratio of the discharge capacity at the current density of 1.0 mA/cm$^2$ to that at the current density of 0.5 mA/cm$^2$, taken as 100, was obtained as a current load ratio.

The current load ratio is shown in Table 2.

EXAMPLE 9

The coin type nonaqueous secondary battery prepared in Example 1 was evaluated in the same manner as in Example 8. The current load ratio is shown in Table 2.

EXAMPLE 10

Spinel-type lithium manganate was synthesized in the same manner as in Example 1, except that the electrolytic manganese dioxide was pulverized to an average particle size of 30 gm. A coin type nonaqueous secondary battery was assembled using the resulting spinel-type lithium manganate as a cathode material in the same manner as in Example 1, and evaluated in the same manner as in Example 8. The current load ratio is shown in Table 2.

EXAMPLE 11

Spinel-type lithium manganate was synthesized in the same manner as in Example 1, except that the electrolytic manganese dioxide was pulverized to an average particle size of 35 μm. A coin type nonaqueous secondary battery was assembled using the resulting spinel-type lithium manganate as a cathode material in the same manner as in Example 1, and evaluated in the same manner as in Example 8. The current load ratio is shown in Table 2.

TABLE 2

|  |  | Average Particle Size (μm) | Current Load Ratio (%) |
| --- | --- | --- | --- |
| Example | 8 | 5 | 92 |
|  | 9 | 20 | 89 |
|  | 10 | 30 | 84 |
|  | 11 | 35 | 71 |

Industrial Applicability

As described above, use of spinel-type lithium manganate obtained by the process of the present invention in a nonaqueous secondary battery as a cathode material makes it possible to suppress dissolution of manganese during charging thereby to improve the battery characteristics, such as high-temperature storage properties and high-temperature cycle characteristics, and a current load ratio.

What is claimed is:

1. A process of producing lithium manganate having a spinel structure comprising the steps of:

pulverizing electrolytic manganese dioxide; neutralizing the manganese dioxide powder with sodium hydroxide or sodium carbonate to a pH of from 2 to 5.5;

mixing the neutralized electrolytic manganese dioxide powder with a lithium raw material; and firing the mixture.

2. The process of producing lithium manganate having a spinel structure as set forth in claim 1, wherein the pulverized manganese dioxide has an average particle size of 5 to 30 μm.

3. The process of producing lithium manganate having a spinel structure as set forth in claim 1 wherein the firing is carried out at 750° C. or higher.

4. A cathode material for a nonaqueous secondary battery comprising lithium manganate having a spinel structure and containing sodium in an amount of 0.05 to 1.0% by weight obtained by the process of production set forth in claim 1,.

5. A nonaqueous secondary battery composed of a cathode using the cathode material set forth in claim 4, an anode capable of intercalating and disintercalating lithium, and a nonaqueous electrolytic solution.

6. The process of producing lithium manganate having a spinel structure as set forth in claim 2, wherein the firing is carried out at 750° C. or higher.

7. A cathode material for a nonaqueous secondary battery comprising lithium manganate having a spinel structure and containing sodium in an amount of 0.05 to 1.0% by weight obtained by the process of production set forth in claim 2.

8. A cathode material for a nonaqueous secondary battery comprising lithium manganate having a spinel structure and containing sodium in an amount of 0.05 to 1.0% by weight obtained by the process of production set forth in claim 3.

9. A nonaqueous secondary battery composed of a cathode using the cathode material set forth in claim 7, an anode capable of intercalating and disintercalating lithium, and a nonaqueous electrolytic solution.

10. A nonaqueous secondary battery composed of a cathode using the cathode material set forth in claim 8, an anode capable of intercalating and disintercalating lithium, and a nonaqueous electrolytic solution.

* * * * *